(12) United States Patent
Takahashi et al.

(10) Patent No.: US 11,169,053 B2
(45) Date of Patent: *Nov. 9, 2021

(54) VEHICLE TESTING DEVICE HAVING A SAFETY FENCE

(71) Applicant: MEIDENSHA CORPORATION, Tokyo (JP)

(72) Inventors: Toshimichi Takahashi, Ota (JP); Shoki Suto, Ota (JP); Noriaki Hirokami, Midori (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/975,780

(22) PCT Filed: Feb. 14, 2019

(86) PCT No.: PCT/JP2019/005183
§ 371 (c)(1),
(2) Date: Aug. 26, 2020

(87) PCT Pub. No.: WO2019/167631
PCT Pub. Date: Sep. 6, 2019

(65) Prior Publication Data
US 2020/0408642 A1    Dec. 31, 2020

(30) Foreign Application Priority Data

Feb. 28, 2018  (JP) .............................. JP2018-034078
Jul. 30, 2018  (JP) .............................. JP2018-142233

(51) Int. Cl.
*G01M 17/007*      (2006.01)

(52) U.S. Cl.
CPC .............................. *G01M 17/0074* (2013.01)

(58) Field of Classification Search
CPC ........... G01M 17/0074; G01M 17/007; G01M 17/013; F16P 1/00; E01F 13/00
See application file for complete search history.

(56) References Cited

U.S. PATENT DOCUMENTS 8,176,677 B1 * 5/2012 Blackmon, III ...... E06B 11/045
                                                  49/49
10,393,627 B2   8/2019 Etches et al.
2018/0003590 A1  1/2018 Etches et al.

FOREIGN PATENT DOCUMENTS

CN        106706336 A    5/2017
JP        58-21844 U     2/1983
(Continued)

OTHER PUBLICATIONS

U.S. Appl. No. 16/975,456, filed Aug. 25, 2020, Meidensha Corporation.

(Continued)

*Primary Examiner* — Eric S. McCall
*Assistant Examiner* — Timothy P Graves
(74) *Attorney, Agent, or Firm* — Foley & Lardner LLP

(57) ABSTRACT

A vehicle testing device includes a safety fence for a front wheel of a test vehicle. The safety fence includes a fixed fence part and a slide fence part. The fixed fence part is structured to be disposed at a front side of the front wheel, and arranged substantially in parallel with the front wheel. The slide fence part is arranged in parallel with the fixed fence part, and structured to move toward a central part of the test vehicle.

18 Claims, 10 Drawing Sheets

(56) References Cited

FOREIGN PATENT DOCUMENTS

| JP | 03-126617 U | 12/1991 | | |
|----|----|----|----|----|
| JP | 05-011044 U | 2/1993 | | |
| JP | 08-026649 A | 1/1996 | | |
| JP | 2005-024430 A | 1/2005 | | |
| JP | 2010-169485 A | 8/2010 | | |
| JP | 2010169485 | * 8/2010 | ............ | G01M 17/00 |
| JP | 2016-023413 A | 2/2016 | | |

OTHER PUBLICATIONS

USPTO Notice of Allowance, U.S. Appl. No. 16/975,456, dated Mar. 10, 2021, 19 pages.
U.S. Appl. No. 17/264,015, filed Jan. 28, 2021, Meidensha Corporation.
USPTO Office Action, U.S. Appl. No. 17/264,015, dated Jul. 8, 2021, 15 pages.

* cited by examiner (a)

(b)

VEHICLE TESTING DEVICE HAVING A SAFETY FENCE

TECHNICAL FIELD

The present invention relates to a vehicle testing device such as a chassis dynamometer for mounting a vehicle via rollers, and testing fuel efficiency, exhaust gas and others, wherein the vehicle testing device includes a safety fence.

BACKGROUND ART

A vehicle testing device is provided with a safety fence for preventing the occurrence of an accident where a person accidentally contacts a driving wheel when the driving wheel is rotating at high speed during vehicle testing operation (see patent documents 1 and 2).

Patent document 1 discloses a safety fence that is attached to a pit cover, and includes an angled fence that can be angled for preventing interference with an opening and closing door of a test vehicle, wherein the safety fence serves to prevent a person from entering a space between the safety fence and the test vehicle.

Patent document 2 discloses a safety fence that includes a vertical frame rod and a safety fence body mounted to the vertical frame rod, wherein the vertical frame rod is structured to slide on a slide rail provided in a vehicle testing device.

PRIOR ART DOCUMENT(S)

Patent Document(s)

Patent Document 1: Japanese Patent Application Publication No. 2010-169485
Patent Document 2: Japanese Utility Model Application Publication No. H5-11044

SUMMARY OF INVENTION

However, the safety fence according to patent document 1 includes a large fixed fence even with the angled fence held angled, so that if the vehicle and a test facility are compact, the safety fence may interfere with the vehicle door when the vehicle door is opened and closed, and thereby prevent the vehicle door from being fully opened.

On the other hand, the safety fence according to patent document 2 includes a structure in which the safety fence body is opened by rotation around the vertical frame rod. Accordingly, no auxiliary device (such as a driver aid) can be arranged in a space required to allow operation (opening and closing) of the safety fence.

The present invention has been made in view of the problems described above, and is targeted for providing a vehicle testing device including a safety fence, in which interference with a door of a test vehicle can be prevented regardless of the size of the test vehicle, without limiting the flexibility of layout of an auxiliary device provided for the vehicle testing device.

In view of the foregoing, according to an embodiment of the present invention, a vehicle testing device includes a safety fence for a front wheel of a test vehicle, wherein the safety fence includes: a fixed fence part structured to be disposed at a front side of the front wheel, and arranged substantially in parallel with the front wheel; and a slide fence part arranged in parallel with the fixed fence part, and structured to move toward a central part of the test vehicle.

According to an embodiment of the present invention, a vehicle testing device includes a safety fence for a rear wheel of a test vehicle, wherein the safety fence includes: a fixed fence part structured to be disposed at a rear side of the rear wheel, and arranged substantially in parallel with the rear wheel; and a slide fence part arranged in parallel with the fixed fence part, and structured to move toward a central part of the test vehicle.

According to an embodiment of the present invention, a vehicle testing device includes: a front-wheel-side safety fence for a front wheel of a test vehicle; and a rear-wheel-side safety fence for a rear wheel of the test vehicle; wherein the front-wheel-side safety fence includes: a front-wheel-side fixed fence part structured to be disposed at a front side of the front wheel, and arranged substantially in parallel with the front wheel; and a slide fence part arranged in parallel with the front-wheel-side fixed fence part, and structured to move toward a central part of the test vehicle; and wherein the rear-wheel-side safety fence includes: a rear-wheel-side fixed fence part structured to be disposed at a rear side of the rear wheel, and arranged substantially in parallel with the rear wheel; and a slide fence part arranged in parallel with the rear-wheel-side fixed fence part, and structured to move toward the central part of the test vehicle.

According to an embodiment of the present invention, a vehicle testing device includes a safety fence for a front wheel of a test vehicle, wherein the safety fence includes: a front-wheel-side fixed fence part structured to be disposed at a front side of the front wheel, and arranged substantially in parallel with the front wheel; and a first front-wheel-side slide fence part arranged in parallel with the front-wheel-side fixed fence part, and structured to move toward a central part of the test vehicle; and a second front-wheel-side slide fence part structured to be arranged in parallel with the front-wheel-side fixed fence part, and move in a vertical direction of the test vehicle.

According to an embodiment of the present invention, a vehicle testing device includes a safety fence for a rear wheel of a test vehicle, wherein the safety fence includes: a rear-wheel-side fixed fence part structured to be disposed at a rear side of the rear wheel, and arranged substantially in parallel with the rear wheel; a first rear-wheel-side slide fence part arranged in parallel with the rear-wheel-side fixed fence part, and structured to move toward a central part of the test vehicle; and a second rear-wheel-side slide fence part structured to be arranged in parallel with the rear-wheel-side fixed fence part, and move in a vertical direction of the test vehicle.

According to an embodiment of the present invention, a vehicle testing device includes: a front-wheel-side safety fence for a front wheel of a test vehicle; and a rear-wheel-side safety fence for a rear wheel of the test vehicle; wherein the front-wheel-side safety fence includes: a front-wheel-side fixed fence part structured to be disposed at a front side of the front wheel, and arranged substantially in parallel with the front wheel; and a first front-wheel-side slide fence part arranged in parallel with the front-wheel-side fixed fence part, and structured to move toward a central part of the test vehicle; and a second front-wheel-side slide fence part structured to be arranged in parallel with the front-wheel-side fixed fence part, and move in a vertical direction of the test vehicle; and wherein the rear-wheel-side safety fence includes: a rear-wheel-side fixed fence part structured to be disposed at a rear side of the rear wheel, and arranged substantially in parallel with the rear wheel; a first rear-wheel-side slide fence part arranged in parallel with the rear-wheel-side fixed fence part, and structured to move toward the central part of the test vehicle; and a second rear-wheel-side slide fence part structured to be arranged in parallel with the rear-wheel-side fixed fence part, and move in the vertical direction of the test vehicle.

According to an embodiment of the present invention, the vehicle testing device includes a third front-wheel-side slide fence part structured to be arranged in parallel with the first front-wheel-side slide fence part, and move in the vertical direction of the test vehicle.

According to an embodiment of the present invention, the vehicle testing device includes a third rear-wheel-side slide fence part structured to be arranged in parallel with the first rear-wheel-side slide fence part, and move in the vertical direction of the test vehicle.

According to an embodiment of the present invention, a vehicle testing device includes a safety fence for a front wheel of a test vehicle, wherein the safety fence includes: a front-wheel-side fixed fence part structured to be disposed at a front side of the front wheel, and arranged substantially in parallel with the front wheel; a first front-wheel-side foldable fence part attached to an end portion of the front-wheel-side fixed fence part, and structured to swing outwardly of the front-wheel-side fixed fence part; and a second front-wheel-side fordable fence part attached to an end portion of the first front-wheel-side foldable fence part, and structured to swing outwardly of the first front-wheel-side foldable fence part.

According to an embodiment of the present invention, a vehicle testing device includes a safety fence for a rear wheel of a test vehicle, wherein the safety fence includes: a rear-wheel-side fixed fence part structured to be disposed at a rear side of the rear wheel, and arranged substantially in parallel with the rear wheel; a first rear-wheel-side foldable fence part attached to an end portion of the rear-wheel-side fixed fence part, and structured to swing outwardly of the rear-wheel-side fixed fence part; and a second rear-wheel-side fordable fence part attached to an end portion of the first rear-wheel-side foldable fence part, and structured to swing outwardly of the first rear-wheel-side foldable fence part.

According to an embodiment of the present invention, a vehicle testing device includes: a front-wheel-side safety fence for a front wheel of a test vehicle; and a rear-wheel-side safety fence for a rear wheel of the test vehicle; wherein the front-wheel-side safety fence includes: a front-wheel-side fixed fence part structured to be disposed at a front side of the front wheel, and arranged substantially in parallel with the front wheel; a first front-wheel-side foldable fence part attached to an end portion of the front-wheel-side fixed fence part, and structured to swing outwardly of the front-wheel-side fixed fence part; and a second front-wheel-side fordable fence part attached to an end portion of the first front-wheel-side foldable fence part, and structured to swing outwardly of the first front-wheel-side foldable fence part; and wherein the rear-wheel-side safety fence includes: a rear-wheel-side fixed fence part structured to be disposed at a rear side of the rear wheel, and arranged substantially in parallel with the rear wheel; a first rear-wheel-side foldable fence part attached to an end portion of the rear-wheel-side fixed fence part, and structured to swing outwardly of the rear-wheel-side fixed fence part; and a second rear-wheel-side fordable fence part attached to an end portion of the first rear-wheel-side foldable fence part, and structured to swing outwardly of the first rear-wheel-side foldable fence part.

According to an embodiment of the present invention, the vehicle testing device includes a third foldable fence part attached to a lower end portion of the front-wheel-side fixed fence part, and structured to be arranged in parallel with the front-wheel-side fixed fence part.

According to an embodiment of the present invention, the vehicle testing device includes a third foldable fence part attached to a lower end portion of the rear-wheel-side fixed fence part, and structured to be arranged in parallel with the rear-wheel-side fixed fence part.

According to an embodiment of the present invention, the vehicle testing device includes a fourth foldable fence part attached to a lower end portion of the second front-wheel-side foldable fence part, and structured to be arranged in parallel with the second front-wheel-side foldable fence part.

According to an embodiment of the present invention, the vehicle testing device includes a fourth foldable fence part attached to a lower end portion of the second rear-wheel-side foldable fence part, and structured to be arranged in parallel with the second rear-wheel-side foldable fence part.

According to the present invention, the vehicle testing device including the safety fence can be prevented from interfering with a door of a test vehicle regardless of the size of the test vehicle, without limitation to the flexibility of layout of an auxiliary device provided for the vehicle testing device.

MODE(S) FOR CARRYING OUT INVENTION

The following describes embodiments of the present invention with reference to the drawings.

Figure 1:
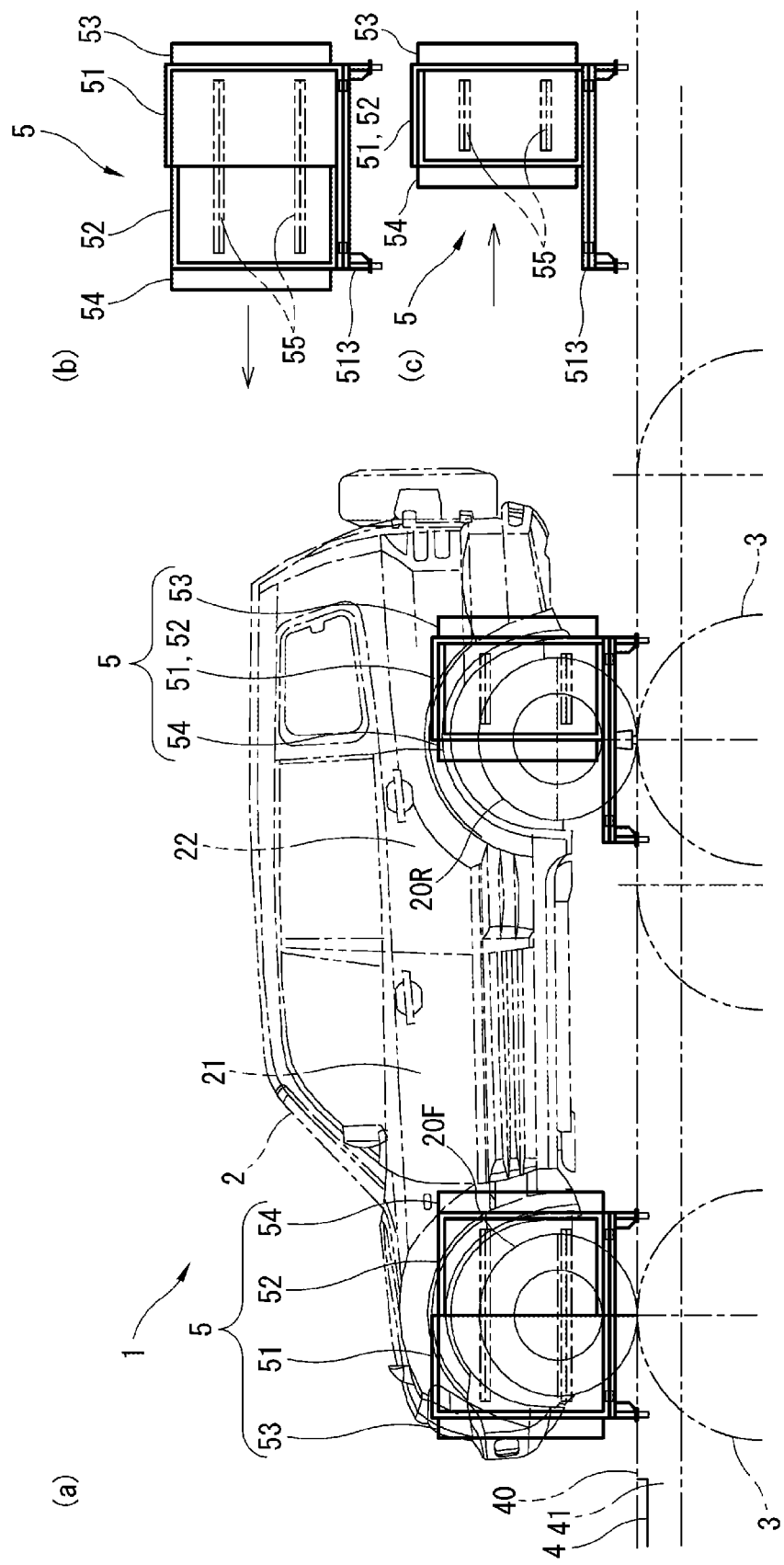
FIG. 1 shows (a) a schematic view of a safety fence provided for a vehicle testing device according to an embodiment of the present invention, (b) an explanatory view of the safety fence when in a closed state, and (c) an explanatory view of the safety fence when in an opened state.
Figure 2:
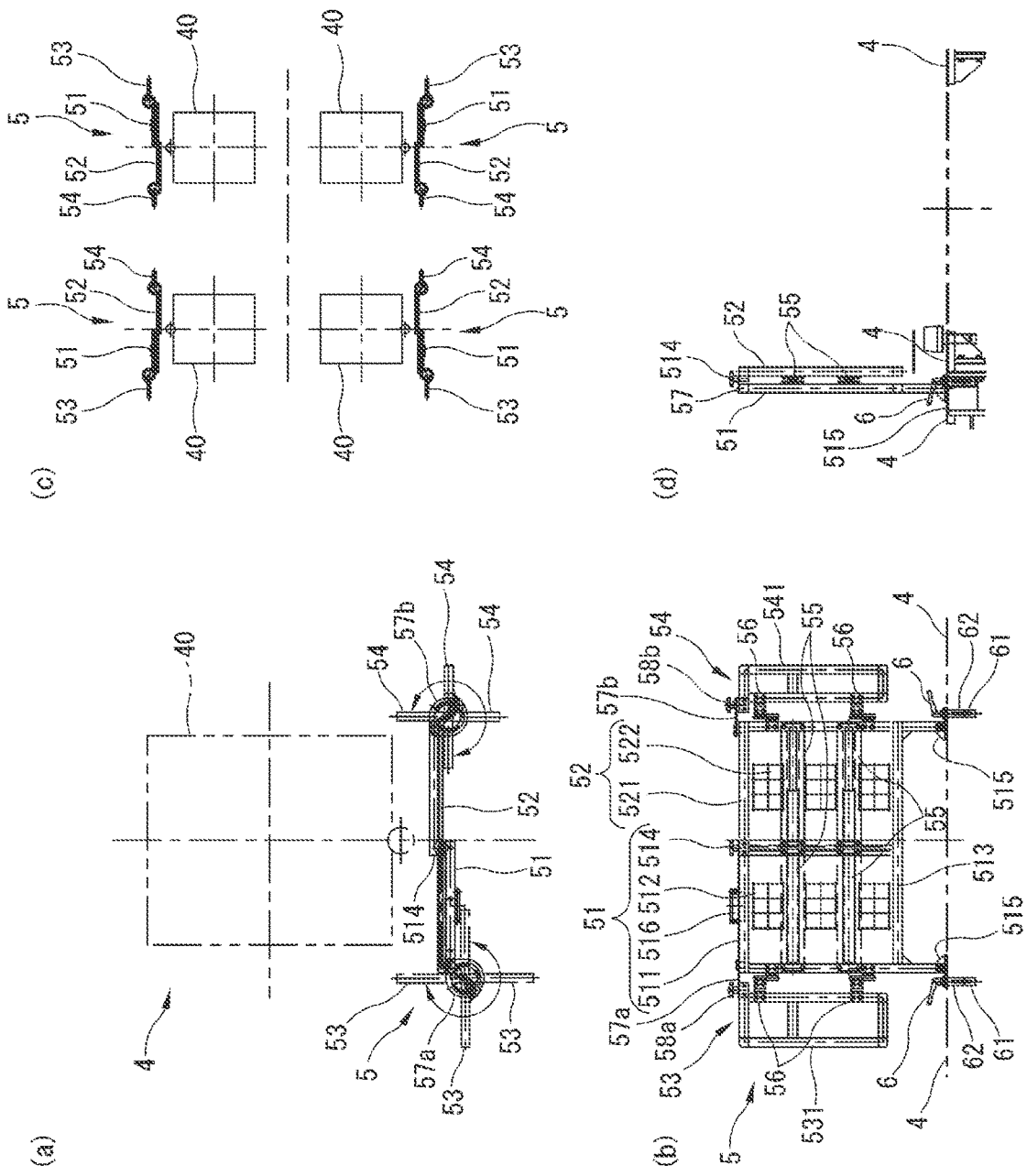
FIG. 2 shows (a) a schematic plan view of the safety fence according to the first embodiment of the present invention, (b) a front view of the safety fence, (c) a plan view showing an example of arrangement of the safety fences, and (d) a side view of the safety fence.

[First Embodiment] FIGS. 1 and 2 show a vehicle testing device 1 according to a first embodiment of the present invention, which includes: a pit cover 4 including roller openings 40 through each of which a roller 3 is exposed, wherein a wheel 20 of a test vehicle 2 is mounted on the roller 3; and safety fences 5 arranged outside the test vehicle 2 and substantially in parallel with the wheels (front wheels 20F and rear wheels 20R).

As shown in FIG. 2 (c), each safety fence 5 is attached to the pit cover 4 along a peripheral edge of one of the roller openings 40 corresponding to each wheel 20 of the test vehicle 2 shown in FIG. 1.

<Example of Safety Fence 5> As shown in FIG. 2 (b), the safety fence 5 includes a fixed fence part 51, a slide fence part 52, a first angled fence part 53, and a second angled fence part 54.

The fixed fence part 51 is arranged substantially in parallel with the wheels 20 of the test vehicle 2.

The fixed fence part 51 includes: a frame 511 implemented by an aluminum frame; a welded wire netting 512 mounted to the frame 511; and a fixed fence support 513 implemented by an aluminum frame, and structured to support the frame 511 upright. The fixed fence part 51 further includes: a third hand knob 514 employed to press and fix the slide fence part 52 to the frame 511; and a handle 516 employed to carry the safety fence 5.

Figure 5:
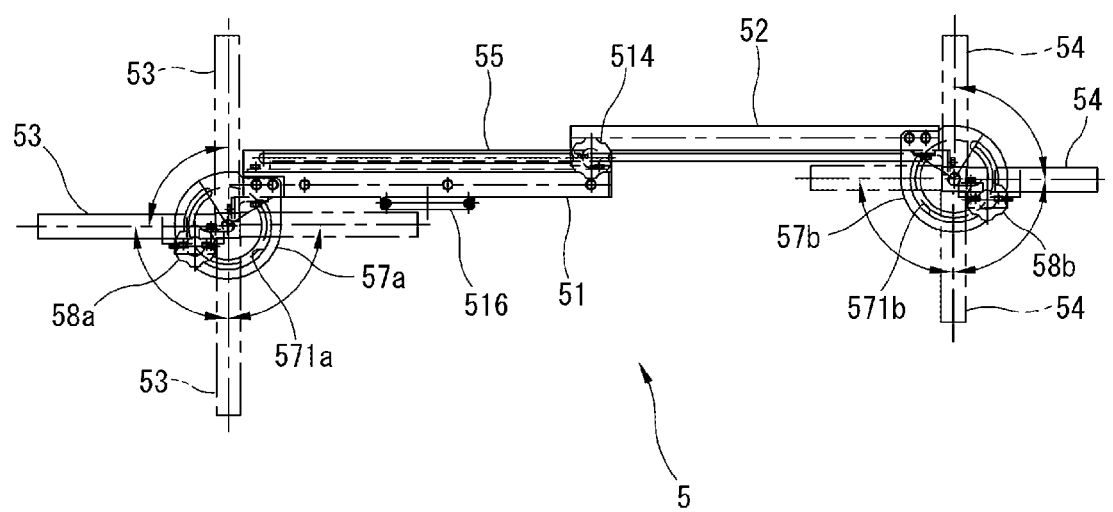
FIG. 5 shows a plan view of the safety fence provided with a first hand knob, a second hand knob, and a third hand knob.

As shown in FIG. 2 (a), the fixed fence part 51 includes a first angle adjustment plate 57a structured to define a range of rotation of the first angled fence part 53. As shown in FIG. 5, the first angle adjustment plate 57a is formed with an arc-shaped slot 571a through which a rotation shaft of a first hand knob 58a is inserted for fixing the first angled fence part 53 to the first angle adjustment plate 57a, wherein the slot 571a defines a range of rotation of the first angled fence part 53 from a position in parallel with the fixed fence part 51 to a position at 270 degrees in a horizontal direction.

The slide fence part 52 is arranged inside the fixed fence part 51 and in parallel with the fixed fence part 51, and structured to move in a longitudinal direction of the test vehicle 2, facing the test vehicle 2.

Specifically, when the safety fence 5 is disposed substantially in parallel with the front wheel 20F of the test vehicle 2, the slide fence part 52 is placed to move toward a central part of the test vehicle 2 in a range from a position closer to a front end part of the front wheel 20F to a position closer to a rear end part of the front wheel 20F as shown in FIG. 1 (a).

On the other hand, when the safety fence 5 is disposed substantially in parallel with the rear wheel 20R of the test vehicle 2, the slide fence part 52 is placed to move toward the central part of the test vehicle 2 in a range from a position closer to a rear end part of the rear wheel 20R to a position closer to a front end part of the rear wheel 20R as shown in FIG. 1 (a)-(c).

As shown in FIG. 2 (b), similar to the fixed fence part 51, the slide fence part 52 includes: a frame 521 implemented by an aluminum frame; and a welded wire netting 522 mounted to the frame 521.

As shown in FIG. 2 (a), the slide fence part 52 includes a second angle adjustment plate 57b structured to define a range of rotation of the second angled fence part 54. As shown in FIG. 5, the second angle adjustment plate 57b is also formed with an arc-shaped slot 571b through which a rotation shaft of a second hand knob 58b is inserted for fixing the second angled fence part 54 to the second angle adjustment plate 57b, wherein the slot 571b defines a range of rotation of the second angled fence part 54 from a position in parallel with the slide fence part 52 to a position at 270 degrees in the horizontal direction.

Figure 4:
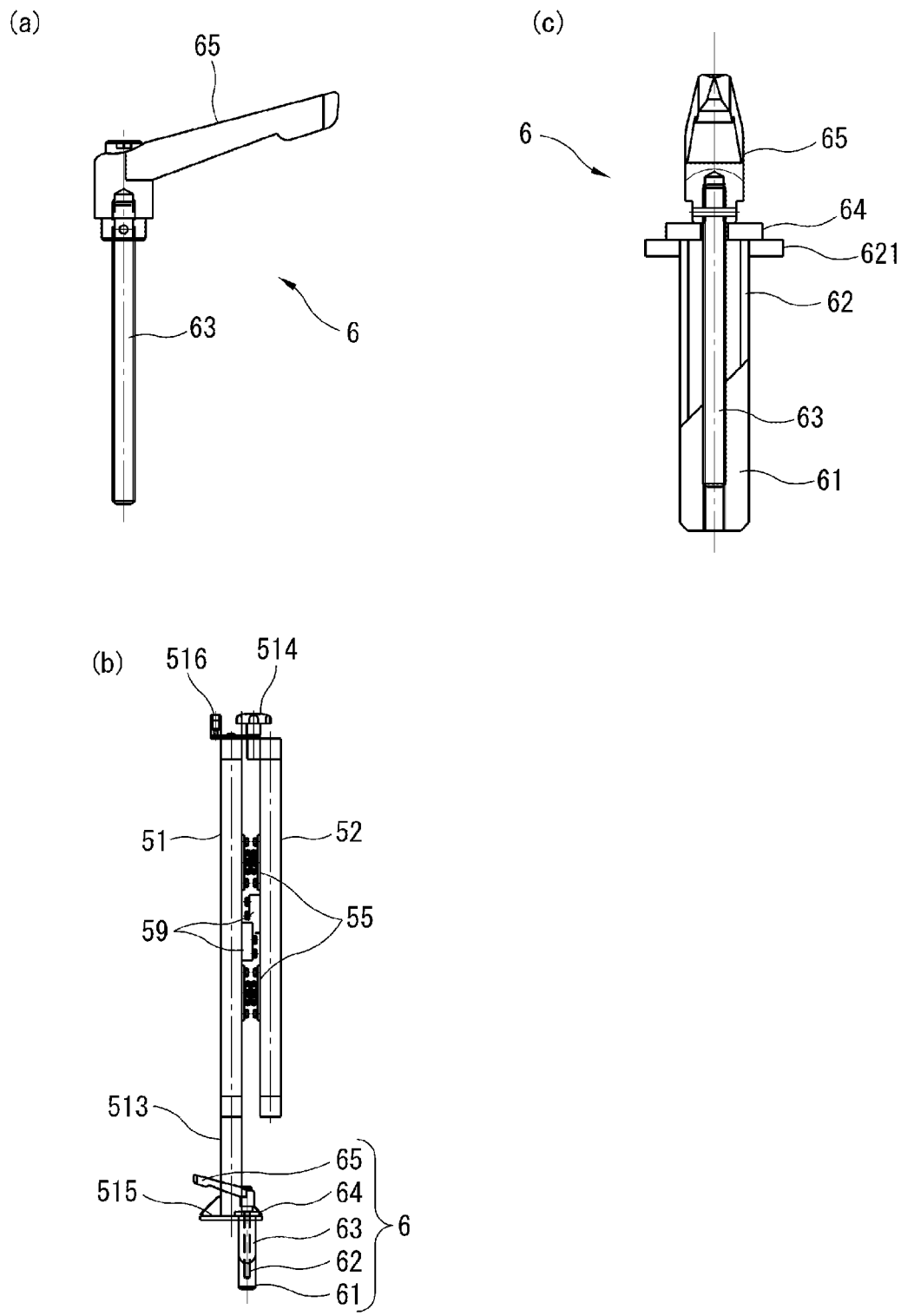
FIG. 4 shows (a) a schematic configuration view of a clamp lever for fixing a safety fence, (b) an explanatory view of the clamp lever when the safety fence is fixed by the clamp lever, and (c) an explanatory view of the clamp lever when a long screw of the clamp lever is screwed in a nut via an insertion pipe and a washer, wherein the nut is built in a pit.

As shown in FIG. 4 (b), a pair of slide rails 55 and a pair of stoppers 59 are provided between the fixed fence part 51 and the slide fence part 52, wherein the slide rails 55 are structured to guide the slide fence part 52 in the longitudinal direction from the position in parallel with the fixed fence part 51, and wherein the stoppers 59 are structured to restrict this guidance.

As shown in FIG. 2 (a) (b), the first angled fence part 53 is attached to an end portion of the fixed fence part 51 by a hinge part 56, and structured to swing inwardly and outwardly of the fixed fence part 51. The first angled fence part 53 includes a frame 531 implemented by an aluminum frame. As well as the fixed fence part 51 and the slide fence part 52, a welded wire netting not shown is mounted to the frame 531 as appropriate.

The first angled fence part 53 is further structured to be pressed and fixed by the first hand knob 58a at a first arbitrary position defined by the slot 571a of the first angle adjustment plate 57a shown in FIG. 5.

As shown in FIG. 2 (b), the second angled fence part 54 is attached to an end portion of the slide fence part 52 by a hinge part 56, and structured to swing inwardly and outwardly of the slide fence part 52. The second angled fence part 54 includes a frame 541 implemented by an aluminum frame. As well as the fixed fence part 51 and the slide fence part 52, a welded wire netting not shown is mounted to the frame 541 as appropriate.

Similar to the first angled fence part 53, the second angled fence part 54 is further structured to be pressed and fixed by the second hand knob 58b at a second arbitrary position defined by the slot 571b of the second angle adjustment plate 57b shown in FIG. 5.

As shown in FIG. 2, the safety fence 5 is structured to be attached to and detached from the pit cover 4 by a fixing tool 6. Specifically, a pedestal 515 of the fixed fence support 513 is fixed to the pit cover 4 by the fixing tool 6.

The fixing tool 6 includes a nut 61, an insertion pipe 62, a long screw 63, a washer 64, and a clamp lever 65. The nut 61 is arranged and fixed in a pit 41 below the pit cover 4. The insertion pipe 62 is structured to press the pedestal portion 515 of the fixed fence support 513 to the pit cover 4 by its flange 621 in a state where the insertion pipe 62 is in contact with the fixed nut 61 at an inclined plane. The long screw 63 is inserted in the insertion pipe 62, and screwed to the nut 61. The clamp lever 65 is attached to an upper end of the long screw 63, and structured to press the flange 621 of the insertion pipe 62 via the washer 64.

<Example of Use of Safety Fence 5> The following describes an example of use of the safety fence 5 according to the present embodiment with reference to FIGS. 1, 2 and 4.

The test vehicle 2 shown in FIG. 1 is placed on the pit 41. When the wheels 20 of the test vehicle 2 are placed on the rollers 3, the safety fences 5 may be attached to the pit covers 4 or may be removed from the pit covers 4. When the safety fence 5 is attached thereto, the fixed fence support 513 of the safety fence 5 is fixed to a predetermined position on the pit cover 4 by the fixing tool 6 as shown in FIG. 2 (b). First, the insertion pipe 62 is inserted into the pit 41 under a condition that the insertion pipe 62 passes through the pedestal 515 of the fixed fence support 513 as shown in FIG. 2, and the lower end of the insertion pipe 62 shown in FIG. 4 is in contact with the upper end of the nut 61 at an inclined plane, wherein the nut 61 is fixed below the pit cover 4. Next, the long screw 63, which is inserted through the washer 64 and the insertion pipe 62, is screwed to the nut 61 by operating the clamp lever 65. Simultaneously, the pedestal 515 of the fixed fence support 513 is pressed by the clamp lever 65 via the washer 64 and the flange 621 of the insertion pipe 62, and the fixed fence support 513 is thereby fixed to the pit cover 4. In particular, the inclined contact between the insertion pipe 62 and the nut 61 serves to prevent the insertion pipe 62 from rotating with the long screw 63 during the operation of screwing, and thereby allow the fixed fence support 513 to be quickly fixed to the pit cover 4.

As described above, the safety fence 5 is placed and fixed along a peripheral edge of the roller opening 40 of the pit cover 4 as shown in FIG. 2 (c).

In particular, when the safety fence 5 is arranged substantially in parallel with the front wheel 20F of the test vehicle 2, the fixed fence part 51 is arranged at a position closer to the front end of the front wheel 20F of the test vehicle 2, while the slide fence part 52 is arranged inside the fixed fence part 51 to be movable in the longitudinal direction of the test vehicle 2.

On the other hand, when the safety fence 5 is arranged substantially in parallel with the rear wheel 20R of the test vehicle 2, the fixed fence part 51 is arranged at a position closer to the rear end of the rear wheel 20R, while the slide fence part 52 is arranged inside the fixed fence part 51 to be movable in the longitudinal direction of the test vehicle 2.

Of the test vehicle 2 shown in FIG. 1, a front door 21 may interfere with the second angled fence part 54 of the safety fence 5. When the front door 21 is to be opened and closed at a driver seat side or passenger seat side, the second angled fence part 54 is rotated to an arbitrary position outside the slide fence part 52 or to a position along the outer surface of the slide fence part 52, and thereafter fixed by the second hand knob 58b, as shown in FIG. 2 (a) and FIG. 5. Alternatively, the slide fence part 52 is operated to slide to an arbitrary position toward the front side of the test vehicle 2, and thereafter fixed by the third hand knob 514. This serves to prevent interference between the front door 21 and the second angled fence part 54 of the safety fence 5.

Similarly, a rear door 22 may interfere with the second angled fence part 54 of the safety fence 5. When the rear door 22 is to be opened and closed at the driver seat side or the passenger seat side, the second angled fence part 54 is rotated to an arbitrary position outside the slide fence part 52 or to a position along the outer surface of the slide fence part 52, and thereafter fixed by the first hand knob 58a, as shown in FIG. 2 (a) and FIG. 5. Alternatively, the slide fence part 52 is operated to slide to an arbitrary position toward the rear side of the test vehicle 2, and thereafter fixed by the third hand knob 514, as shown in FIG. 1 (c). This serves to prevent interference between the rear door 22 and the second angled fence part 54 of the safety fence 5.

When a test is performed for the test vehicle 2, the first angled fence part 53 and the second angled fence part 54 of the safety fence 5 are fixed in positions closer to the test vehicle 2 or in positions substantially in parallel with the test vehicle 2, thereby preventing entry of a person into a space between the safety fence 5 and the test vehicle 2.

When no person is to enter or leave the test vehicle 2 via the rear door 22, the slide fence part 52 of the rear safety fence 5 is operated to slide to an arbitrary position toward the front side of the test vehicle 2, and thereafter fixed by the third hand knob 514, as shown in FIG. 1 (b).

<Effects of Present Embodiment> As described above, with the safety fence 5 according to the present embodiment, when the front door 21 and the rear door 22 of the test vehicle 2 are opened and closed, it is possible to prevent interference between the safety fence 5 and the front door 21 and rear door 22 by operation of the slide fence part 52, the first angled fence part 53, and the second angled fence part 54. Furthermore, it is possible to reduce the space for operating (opening and closing) the safety fence 5 when the front door 21 and the rear door 22 are opened and closed, and thereby enhance the flexibility of layout of auxiliary equipment on the pit 41.

In particular, with regard to the safety fence 5 for the front wheel 20F, the fixed fence part 51 is arranged in the position closer to the front end of the front wheel 20F of the test vehicle 2, and substantially in parallel with the front wheel 20F. On the other hand, the slide fence part 52 is movable toward the central part of the test vehicle 2 from the position in parallel with the fixed fence part 51 facing the test vehicle 2 as shown in FIG. 1 (a), so that the slide fence part 52 may be arbitrarily arranged in the range from the position closer to the front end of the front wheel 20F to the position closer to the rear end of the front wheel 20F. This serves to flexibly adapt to test vehicles 2 various in size, and further enhance the flexibility described above.

With regard to the safety fence 5 for the rear wheel 20R, the fixed fence part 51 is arranged in the position closer to the rear end of the rear wheel 20R of the test vehicle 2, and substantially in parallel with the rear wheel 20R. On the other hand, the slide fence part 52 is movable toward the central part of the test vehicle 2 from the position in parallel with the fixed fence part 51 facing the test vehicle 2 as shown in FIG. 1 (a) (c), so that the slide fence part 52 may be arbitrarily arranged in the range from the position closer to the rear end of the rear wheel 20R to the position closer to the front end of the rear wheel 20R. This serves to flexibly adapt to test vehicles 2 various in size, and further enhance the flexibility described above.

Furthermore, the first angled fence part 53 may be fixed in any position from the position in parallel with the fixed fence part 51 to the position at 270 degrees in the horizontal direction. The second angled fence part 54 may be fixed at any position from the position in parallel with the slide fence part 52 to the position at 270 degrees in the horizontal direction. This serves to allow the first angled fence part 53 and the second angled fence part 54 to be arbitrarily positioned in the safety fence 5.

The feature that the slide fence part 52 is guided in the longitudinal direction of the test vehicle 2 by the slide rails 55 interposed between the fixed fence part 51 and the slide fence part 52, serves to smooth the sliding operation of the slide fence part 52. In particular, the feature that the slide fence part 52 is fixable to the fixed fence part 51 by the third hand knob 514, serves to allow the slide fence part 52 to be fixed to any position in a width direction of the safety fence 5 in accordance with specifications of the test vehicle 2.

Moreover, the feature that the safety fence 5 is mainly made of an aluminum frame and is relatively light and compact, serves to allow the safety fence 5 to be more easily detached for maintenance than conventional safety fences, and further easily carried by the handle 516.

The safety fence 5 is not necessarily attached to the pit cover 4, but may be attached to the roller cover of the roller 3. This also serves to produce the effects described above, and prevent entry of a person into the space between the test vehicle 2 and the safety fence 5.

Furthermore, the feature that the fixed fence support 513 is attachable to the pit cover 4 or the roller cover, serves to apply the safety fence 5 to an existing vehicle testing device. In particular, by the fixing tool 6, it is possible to quickly and firmly attach the safety fence 5 to the pit cover 4 or the roller cover.

Figure 3:
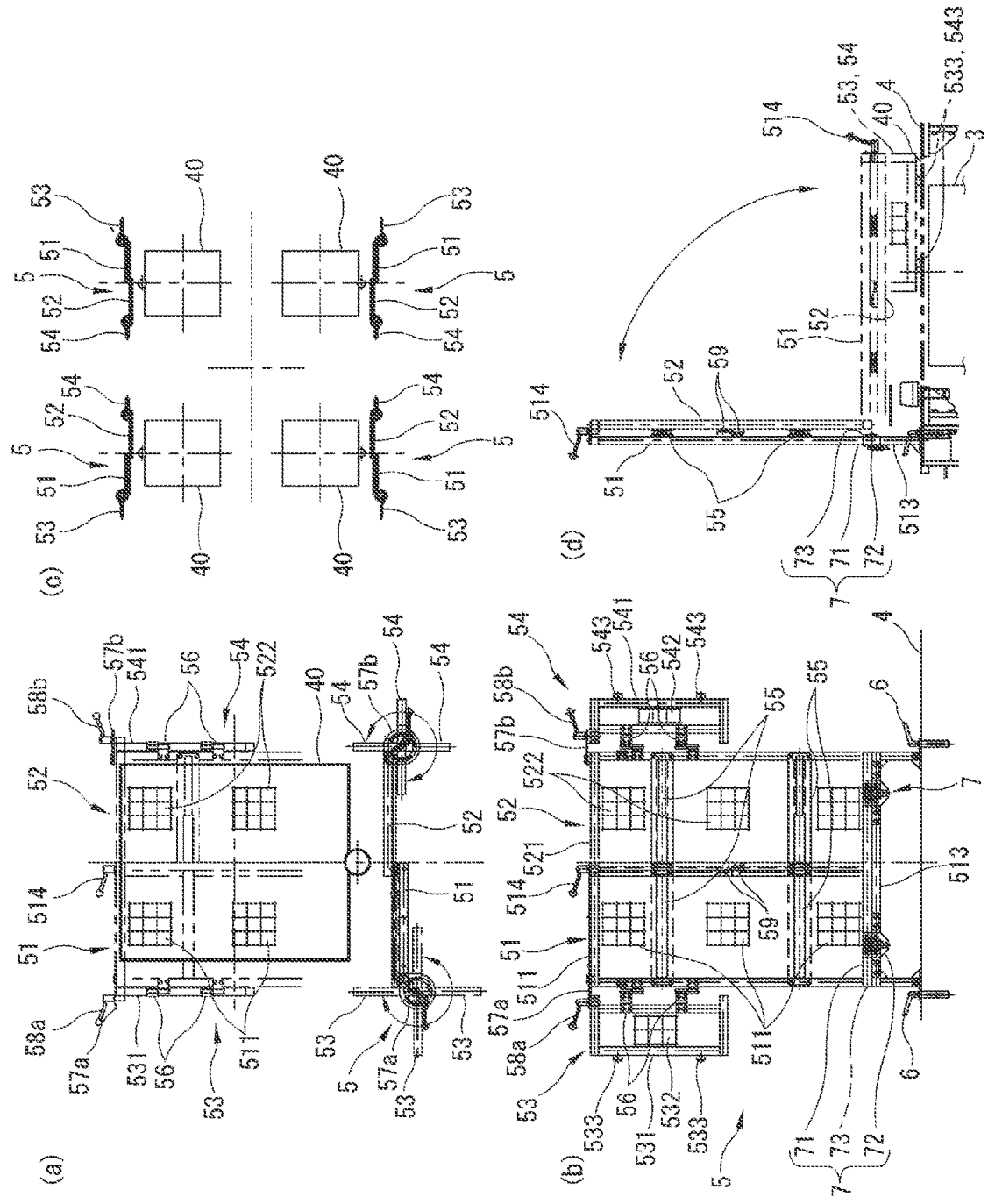
FIG. 3 shows (a) a schematic plan view of a safety fence according to a second embodiment of the present invention, (b) a front view of the safety fence, (c) a plan view showing an example of arrangement of the safety fences, and (d) a side view of the safety fence from a position facing an end of a fixed fence of the safety fence.

[Second Embodiment] FIG. 3 exemplarily shows a safety fence 5 according to a second embodiment, which is produced by additionally providing the safety fence 5 according to the first embodiment with a function of simply covering the roller opening 40.

<Example of Safety Fence 5> The safety fence 5 according to the present embodiment is substantially identical to the safety fence 5 according to the first embodiment except that the fixed fence part 51 and the slide fence part 52 are capable of covering the roller opening 40, and the fixed fence part 51 is capable of being arranged horizontally.

Figure 6:
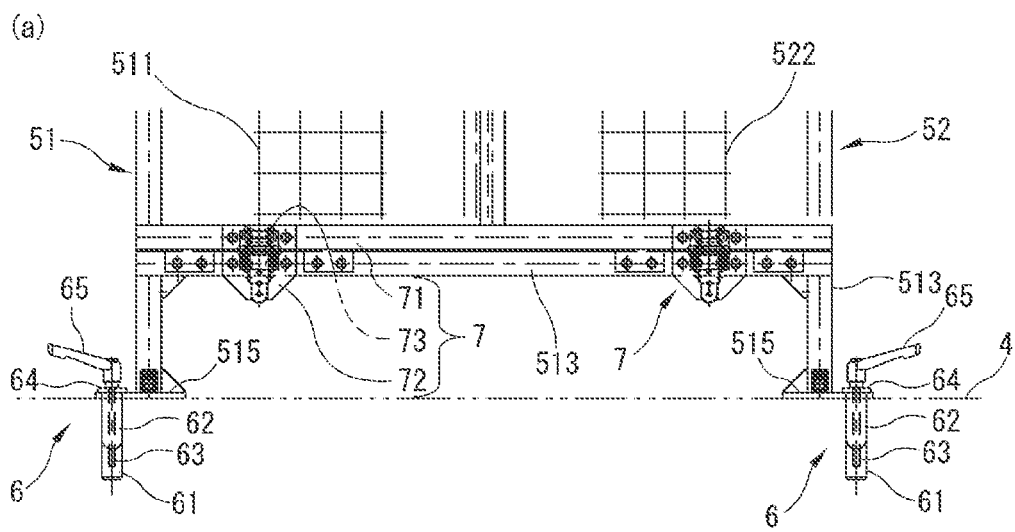
FIG. 6 shows (a) a front view of a roller-side angling part provided in the safety fence according to the second embodiment, and (b) a side view of the roller-side angling part.
Figure 6:
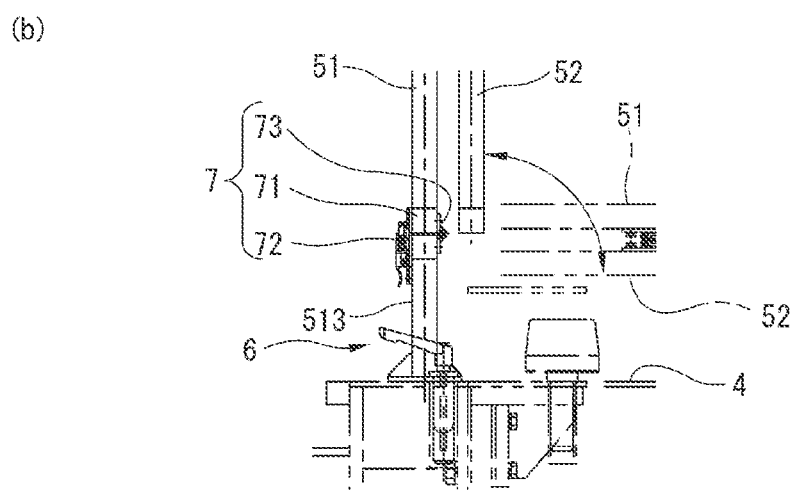

Specifically, as shown in FIG. 6 (a) (b), the safety fence 5 includes a fixed fence part 51, a slide fence part 52, a first angled fence part 53, a second angled fence part 54, and a roller-side angling part 7.

The fixed fence part 51 and the slide fence part 52 are formed such that the dimension of the fixed fence part 51 and the slide fence part 52 when arranged side by side is larger than the dimension of the roller opening 40.

A welded wire netting 532 is mounted to a frame 531 of the first angled fence part 53, and the frame 531 is provided with a pedestal rubber 533 for supporting the first angled fence part 53 on the pit cover 4, wherein the fixed fence part 51 is horizontally placed by the first angled fence part 53.

A welded wire netting 542 is also mounted to a frame 541 of the second angled fence part 54, and the frame 541 is provided with a pedestal rubber 543 for supporting the second angled fence part 54 on the pit cover 4, wherein the slide fence part 52 is horizontally placed by the second angled fence part 54.

The roller-side angling part 7 includes a support 71, a catch clip 72, and a hinge part 73. The support 71 is arranged on the fixed fence support 513 and structured to support the fixed fence part 51 upright. The catch clip 72 is structured to connect the support 71 and the fixed fence support 513 such that the fixed fence part 51 can be released from the upright state. The hinge part 73 is structured to connect the support 71 and the fixed fence support 513 and allow the fixed fence part 51 to be upright or inclined toward the roller opening 40.

<Example of Use of Safety Fence 5> The following describes an example of use of the safety fence 5 according to the present embodiment with reference to FIGS. 3 and 6.

The safety fence 5 according to the present embodiment is normally used as in the first embodiment.

When the test vehicle 2 is not placed on the pit cover 4 of the vehicle testing device, the roller opening 40 is covered by the safety fence 5.

Specifically, the connection between the fixed fence support 513 and the support 71 supporting the fixed fence part 51 is first released by operating the catch clip 72 of the roller-side angling part 7. This allows the fixed fence part 51 to be inclined toward the roller opening 40 by the hinge part 73 of the roller-side angling part 7.

Next, with the first angled fence part 53 and the second angled fence part 54 fixed at 90 degrees from the fixed fence part 51 and the slide fences 52 toward the test vehicle 2, the fixed fence part 51 and the slide fence part 52 are inclined to the roller opening 40.

When the pedestal rubber 533 of the first angled fence part 53 and pedestal rubber 543 of the second angled fence part 54 come into contact with the pit cover 4, the fixed fence part 51 and the slide fence part 52 are supported by the pit cover 4 while being held substantially horizontal by the first angled fence part 53 and the second angled fence part 54. Thereby, the roller opening 40 is covered with the safety fence 5.

<Effects of Present Embodiment> As described above, with the safety fence 5 according to the present embodiment, it is possible to easily cover the roller opening 40 of the pit cover 4 when the test vehicle 2 is not subjected to the test, in addition to the effects of the first embodiment. Accordingly, the safety fence 5 is in a state to prevent a person from directly contacting the roller opening 40, thereby preventing accidents such as an accident that a person falls into the roller opening 40, and an accident that a foot of a person enters the space between the pit cover 4 and the roller 3.

In particular, the feature that the fixed fence part 51 is capable of covering the roller opening 40 and being arranged substantially horizontally to correspond in position to the roller opening 40, serves to allow the roller opening 40 to be simply and reliably covered by the fixed fence part 51. Furthermore, the first angled fence part 53 and the second angled fence part 54 are capable of simply and firmly supporting the fixed fence part 51 arranged substantially horizontally on the pit cover 4. This eliminates the necessity of preparing a separate cover for covering the roller opening 40.

Figure 7:
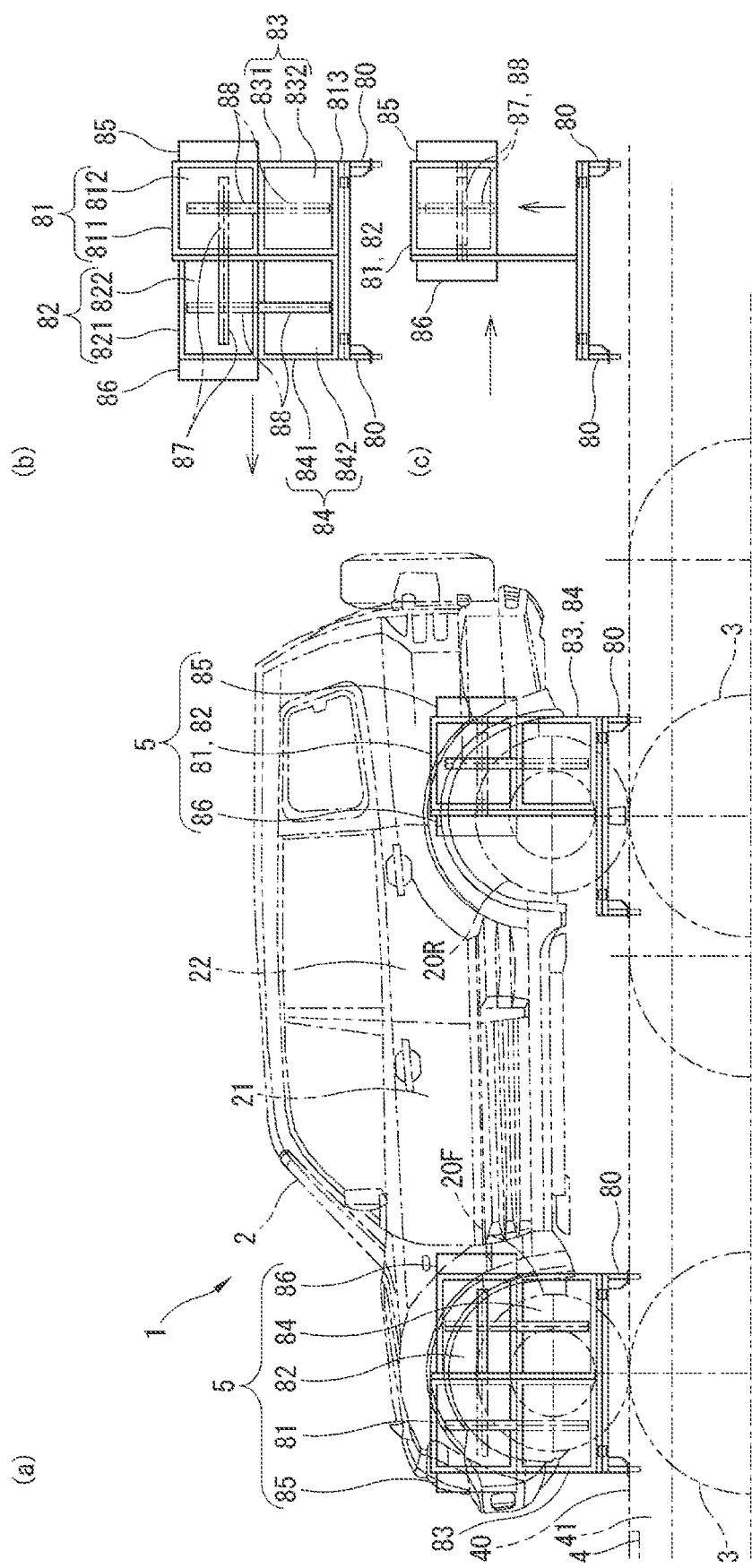
FIG. 7 shows (a) a schematic view of a safety fence for a vehicle testing device according to a third embodiment of the present invention, (b) an explanatory view of the safety fence when in a closed state, and (c) an explanatory view of the safety fence when in an opened state.
Figure 10:
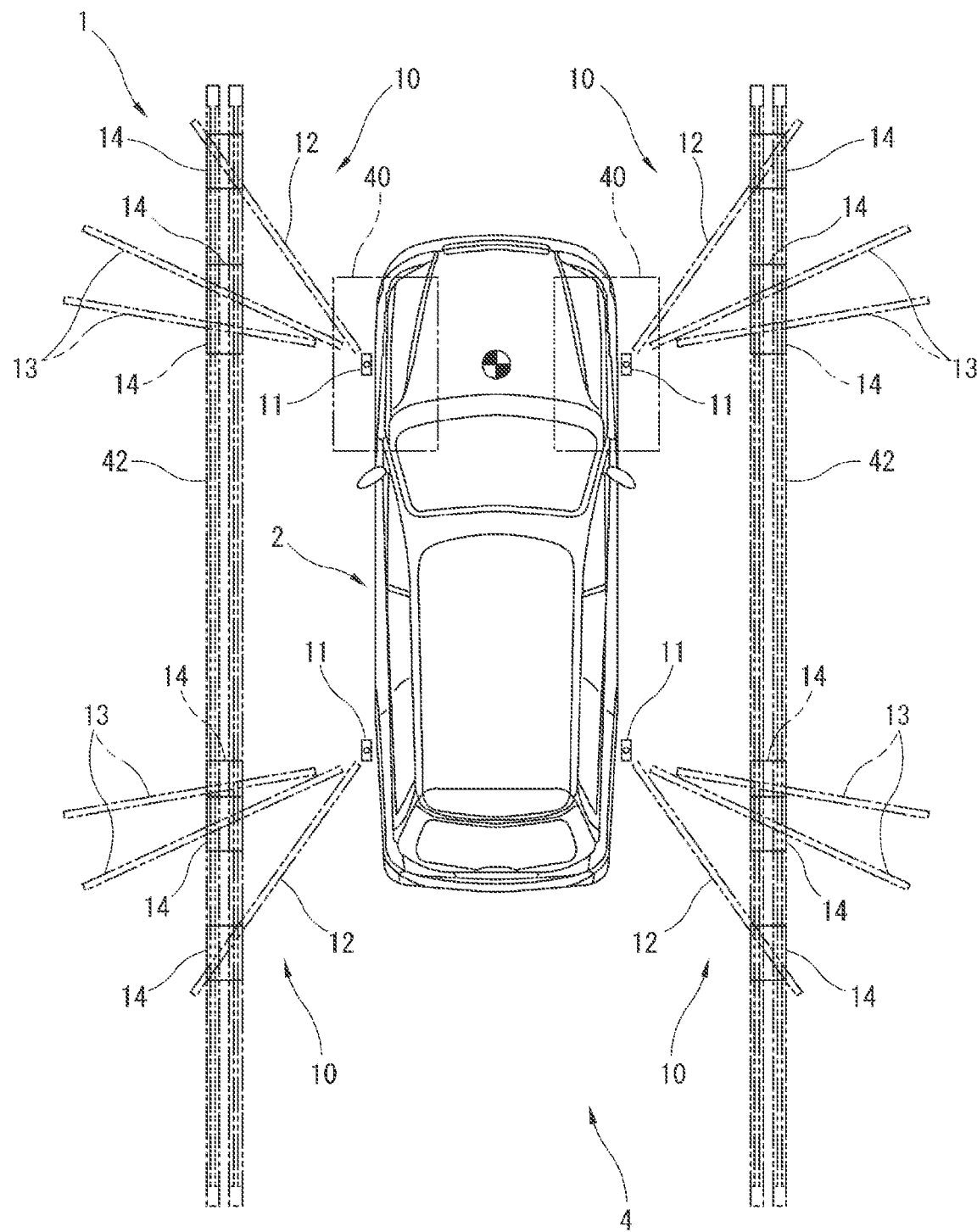
FIG. 10 is a top view illustrating a condition that a test vehicle is restrained in the vehicle testing device.

[Third Embodiment] FIG. 7 exemplarily shows a safety fence 5 according to a third embodiment, which serves to prevent physical interference with a vehicle restraining device 10 connected to a wheel hub of the wheel 20 of the test vehicle 2 illustrated in FIG. 10.

<Example of Safety Fence 5> The safety fence 5 according to this embodiment includes a fixed fence part 81, a first slide fence part 82, a second slide fence part 83, a third slide fence part 84, a first angled fence part 85, and a second angled fence part 86.

The fixed fence part 81 is arranged substantially in parallel with the wheel (the front wheel 20F, the rear wheel 20R) of the test vehicle 2 that is mounted on the roller 3 exposed through the roller opening 40 of the pit cover 4.

The fixed fence part 81 includes: a rectangular frame 811 made of a steel material; a welded wire netting 812 mounted to the frame 811; and an L-shaped frame support part 813 structured to support the frame 811 in a predetermined height position while being held upright on a support 80 attached to the pit cover 4.

The first slide fence part 82 is arranged in parallel with the fixed fence part 81, and structured to move in the longitudinal direction of the test vehicle 2. The first slide fence part 82 includes: a frame 821 substantially identical in shape to the frame 811; and a welded wire netting 822 mounted to the frame 821.

Between the fixed fence part 81 and the first slide fence part 82, a pair of slide rails 87 are further provided to guide the first slide fence part 82 in the longitudinal direction within a range of the width of the first slide fence part 82 from the position where the first slide fence part 82 is located in parallel with the fixed fence part 81.

The second slide fence part 83 is structured to move in the vertical direction of the test vehicle 2, and be arranged in parallel with the fixed fence part 81 and the first slide fence part 82. The second slide fence part 83 includes: a rectangular frame 831 made of a steel material, similar to the frame 811; and a welded wire netting 832 mounted to the frame 831.

Between the fixed fence part 81 and the second slide fence part 83, a pair of slide rails 88 are further provided to guide the second slide fence part 83 in the vertical direction within a range of the vertical length of the second slide fence part 83 from the position where the second slide fence part 83 is located in parallel with the fixed fence part 81.

The third slide fence part 84 is structured to move in the vertical direction, and be arranged in parallel with the fixed fence part 81, the first slide fence part 82 and the second slide fence part 83. The third slide fence part 84 includes: a frame 841 substantially identical in shape to the frame 821 of the first slide fence part 82; and a welded wire netting 842 mounted to the frame 841.

Between the first slide fence part 82 and the third slide fence part 84, a pair of slide rails 88 are further provided to guide the third slide fence part 84 in the vertical direction within a range of the vertical length of the third slide fence part 84 from the position where the third slide fence part 84 is located in parallel with the first slide fence part 82.

The first angled fence part 85 is structured similarly to the first angled fence part 53 according to the first embodiment, and is attached to an end portion of the fixed fence part 81, and structured to swing inwardly and outwardly of the fixed fence part 81.

The second angled fence part 86 is structured similarly to the second angled fence part 54 according to the first embodiment, and is attached to an end portion of the first slide fence part 82, and structured to swing inwardly and outwardly of the first slide fence part 82.

<Example of Vehicle Restraining Device 10> As shown in FIG. 10, the vehicle restraining device 10 includes: a hub connecting part 11 attached to the wheel hub of the wheel 20 of the test vehicle 2; a wheel hub rod 12 connected rotatably to the hub connecting part 11; and a fixing rod 13 connected rotatably close to an end portion of the wheel hub rod 12 closer to the hub connecting part 11.

As shown in FIG. 10, the wheel hub rod 12 and the fixing rod 13 are held by a rod holder 14 that is mounted to an arbitrary position on a slide rail 42 of the vehicle testing device 1.

<Example of Use of Safety Fence 5> The following describes an example of use of the safety fence 5 according to the present embodiment with reference to FIGS. 7 and 10.

As shown in FIGS. 7 and 10, the safety fence 5 is arranged along a peripheral edge of the roller opening 40 by fixing the support 80 to the pit cover 4 by the clamp lever 65 not shown, similar to the support 50 according to the first embodiment.

In particular, when the safety fence 5 is arranged substantially in parallel with the front wheel 20F of the test vehicle 2, the fixed fence part 81 is located at a position closer to the front end of the front wheel 20F of the test vehicle 2, as shown in FIG. 7A.

On the other hand, when the safety fence 5 is arranged substantially in parallel with the rear wheel 20R of the test vehicle 2, the fixed fence part 81 is located at a position closer to the rear end of the rear wheel 20R.

Next, with regard to the safety fence 5 for the rear wheel 20R, the second slide fence part 83 and the third slide fence part 84 are operated to slide upward toward the fixed fence part 81 and the first slide fence part 82, respectively, while the first slide fence part 82 is operated to slide toward the fixed fence part 81. Accordingly, the safety fence 5 shifts from the state shown in FIG. 7 (b) to the state shown in FIG. 7 (c), so that the first slide fence part 82, the second slide fence part 83, and the third slide fence part 84 are arranged in parallel with the fixed fence part 81.

With regard to the safety fence 5 for the front wheel 20F, the first slide fence part 82, the second slide fence part 83, and the third slide fence part 84 shown in FIG. 7 (a) are arranged in parallel with the fixed fence part 81 by similar operation.

Next, as shown in FIG. 10, the hub connecting part 11 of the vehicle restraining device 10 is attached to the wheel hub of the wheel 20 of the test vehicle 2, and the wheel hub rod 12 is further attached to the hub connecting part 11. The fixing rod 13 is beforehand connected close to the end portion of the wheel hub rod 12. Then, the wheel hub rod 12 and the fixing rod 13 are held by the rod holder 14 that is mounted to an arbitrary position on the slide rail 42 of the vehicle testing device 1.

<Effects of Present Embodiment> As described above, the safety fence 5 according to the present embodiment produces the following effects in addition to the effects of the first embodiment.

Specifically, when the vehicle door (the front door 21, the rear door 22) of the test vehicle 2 is opened and closed, the first slide fence part 82, the second slide fence part 83, and the third slide fence part 84 can be operated individually to slide and move arbitrarily in the longitudinal direction and the vertical direction of the test vehicle 2, thereby preventing interference with the vehicle door. This serves to expand the range of opening and closing of the vehicle door of the test vehicle 2 provided to the vehicle testing device 1.

In particular, as described above, the present embodiment serves to ensure an empty space at the lower side of the safety fence 5 (particularly, below the fixed fence part 81) by sliding operation of the first slide fence part 82, the second slide fence part 83, and the third slide fence part 84 into arrangement in parallel with the fixed fence part 81.

Therefore, even when a vehicle restraining device of a wheel hub connection type like the vehicle restraining device 10 shown in FIG. 10 is employed by the vehicle testing device 1, it is possible to prevent physical interference between the safety fence 5 and the wheel hub rod 12 and the fixing rod 13 of the vehicle restraining device 10. Furthermore, it enhances the efficiency of workability when the wheel hub rods 12 of the vehicle restraining device 10 are attached to the wheel hubs of the front wheel 20F and the rear wheel 20R of the test vehicle 2.

The safety fence according to the present invention including the slide fence part is not limited to the third embodiment, but may be formed appropriately in accordance with various forms of vehicle testing devices, vehicle restraining devices, and vehicle testing systems. For example, with regard to the embodiment shown in FIG. 7, the safety fence 5 may be composed of the fixed fence part 81, the first slide fence part 82, the second slide fence part 83, the first angled fence part 85, and the second angled fence part 86, or may be composed of the fixed fence part 81, the first slide fence part 82, the third slide fence part 84, the first angled fence part 85, and the second angled fence part 86. These embodiments also belong to the technical scope of the present invention.

Figure 8:
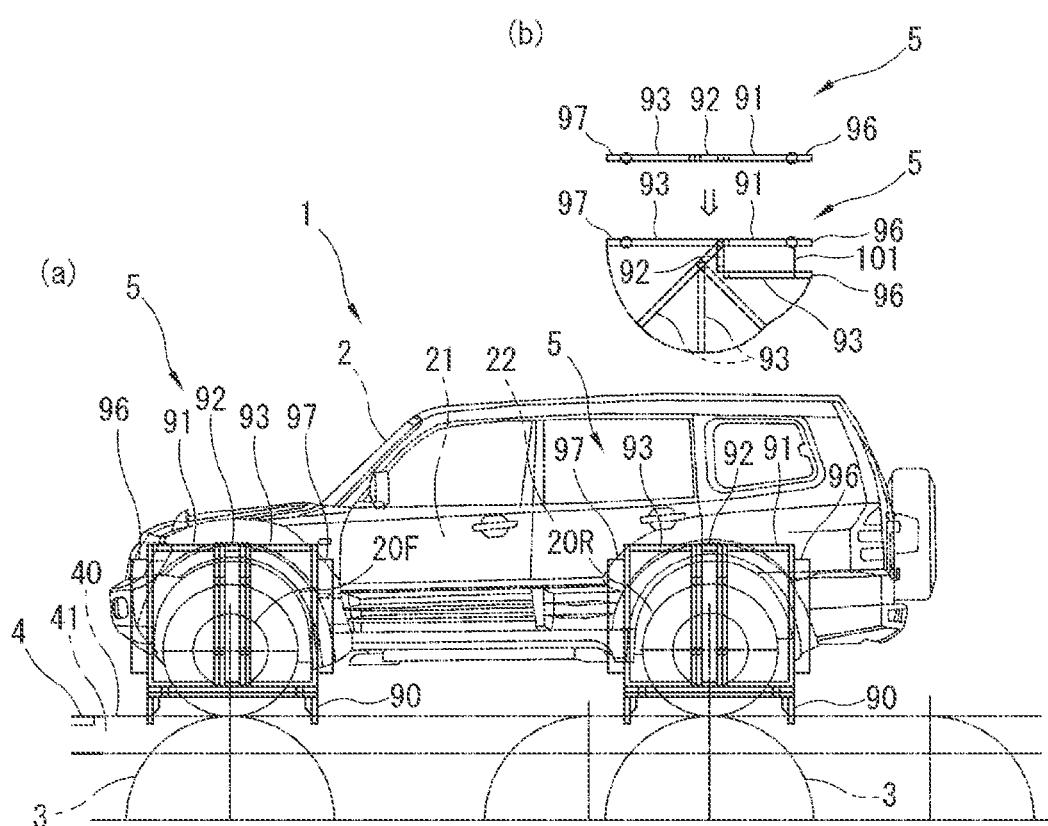
FIG. 8 shows (a) a schematic view of a first example of a safety fence for a vehicle testing device according to a fourth embodiment of the present invention, and (b) an explanatory view illustrating operation of the safety fence.

[Fourth Embodiment] FIG. 8 exemplarily shows a safety fence 5 according to a fourth embodiment, which serves to prevent physical interference with the vehicle restraining device 10 connected to the wheel hub of the wheel 20 of the test vehicle 2 illustrated in FIG. 10.

<Examples of Safety Fence 5> As shown in FIGS. 8 and 10, the safety fence 5 is attached to the pit cover 4 along a peripheral edge of one of the roller openings 40 corresponding to each wheel 20 of the test vehicle 2 shown in FIG. 10.

<First Example of Safety Fence 5> As shown in FIG. 8, the safety fence 5 according to the first example includes a fixed fence part 91, a first foldable fence part 92, a second foldable fence part 93, and a first angled fence part 96, and a second angled fence part 97.

The fixed fence part 91 is disposed substantially in parallel with the wheel (the front wheel 20F, the rear wheel 20R) of the test vehicle 2 mounted on the roller 3 exposed through the roller opening 40 of the pit cover 4. The fixed fence part 91 is supported upright by the support 90 attached to the pit cover 4.

As shown in FIG. 8 (b), the first foldable fence part 92 is attached to an end portion of the fixed fence part 91, and structured to swing outwardly of the fixed fence part 91.

The second foldable fence part 93 is attached to an end portion of the first foldable fence part 92, and structured to swing outwardly of the first foldable fence part 92.

The first angled fence part 96 is attached to an end portion of the fixed fence part 91, and structured to swing inwardly and outwardly of the fixed fence part 91.

The second angled fence part 97 is attached to an end portion of the second foldable fence part 93, and structured to swing inwardly and outwardly of the second foldable fence part 93.

Figure 9:
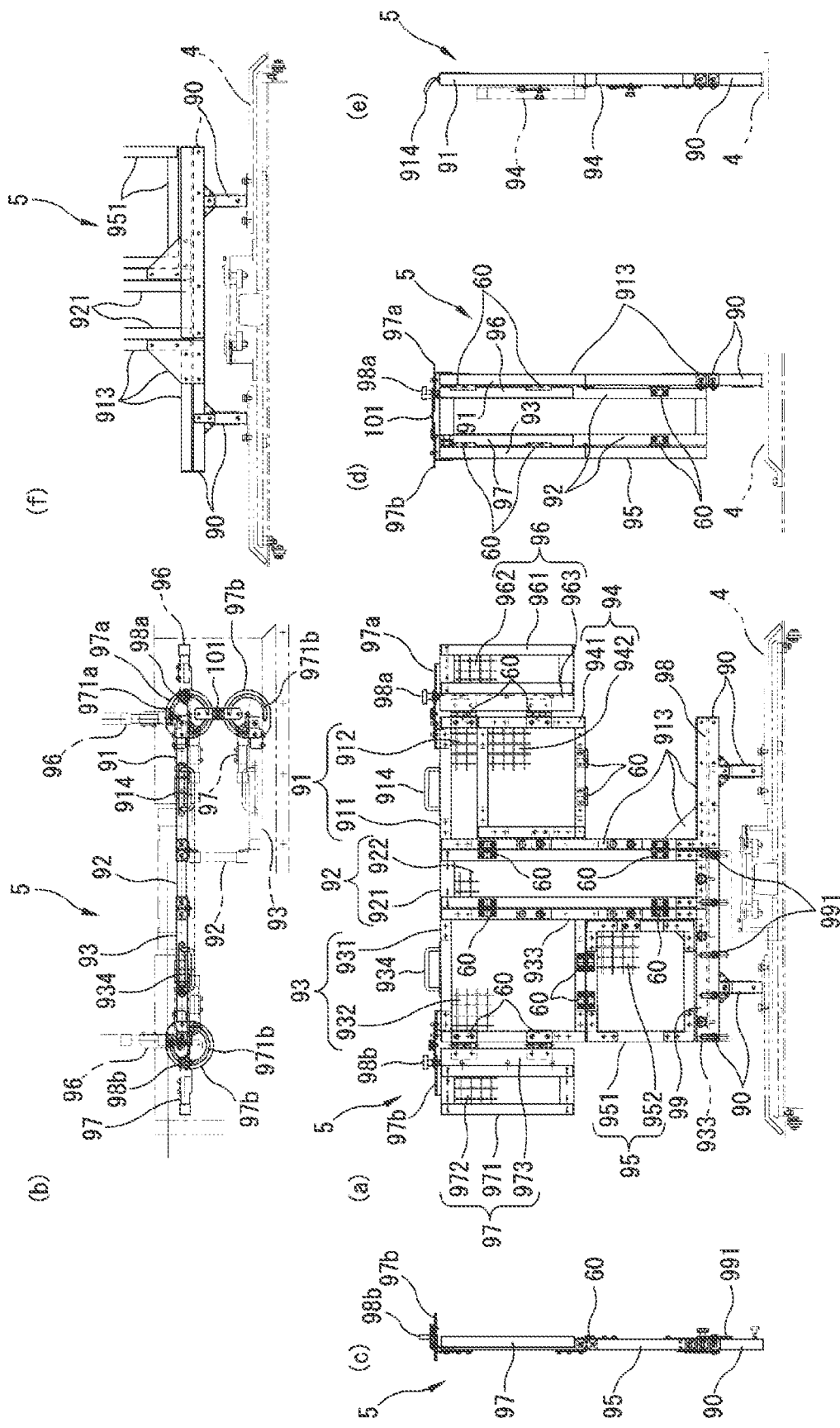
FIG. 9 shows (a) a front view of a second example of a safety fence according to a fourth embodiment of the present invention, (b) a plan view of the safety fence, (c) a side view of the safety fence from a position facing its first end side, (d) a side view of the safety fence in a folded state from a position facing its second end side, (e) a side view of the safety fence in an unfolded state from the position facing its second end side, and (f) a rear view of a lower part of the safety fence.

<Second Example of Safety Fence 5> As shown in FIG. 9, the safety fence 5 according to the second example includes a fixed fence part 91, a first foldable fence part 92, a second foldable fence part 93, and a third foldable fence part 94, a fourth foldable fence part 95, a first angled fence part 96, a second angled fence part 97, a first support member 98, and a second support member 99.

<Example of Fixed Fence Part 91> The fixed fence part 91 is disposed substantially in parallel with the wheel 20 of the test vehicle 2 mounted on the roller 3 exposed through the roller opening 40 of the pit cover 4.

As shown in FIG. 9 (a) (f), the fixed fence part 91 includes: a substantially rectangular frame 911 made of a steel material; a welded wire netting 912 mounted to the frame 911; and an L-shaped frame support part 913 structured to support the frame 911 in a predetermined height position while being held upright on a support 90 attached to the pit cover 4.

Furthermore, the fixed fence part 91 is provided with a handle 914 for carrying the safety fence 5, and a first angle adjustment plate 97a for defining a range of rotation of the first angled fence part 96.

As shown in FIG. 9 (b), the first angle adjustment plate 97a is formed with a slot 971a through which a rotation shaft of a first hand knob 98a is inserted for fixing the first angled fence part 96 to the first angle adjustment plate 97a. The slot 971a is arc-shaped and defines a range of rotation of the first angled fence part 96 from a position in parallel with the fixed fence part 91 to a position at 270 degrees in a horizontal direction.

<Example of First Foldable Fence Part 92> The first foldable fence part 92 is attached to an end portion of the fixed fence part 91, and structured to swing outwardly of the fixed fence part 91.

The first foldable fence part 92 includes: a rectangular frame 921 longer and narrower than the frame 911 of the fixed fence part 91; and a welded wire netting 922 mounted to the frame 921.

The frame 921 is connected to the frame support 913 of the fixed fence part 91 via a hinge part 60, and structured to swing outwardly of the fixed fence part 91.

<Example of Second Foldable Fence Part 93> The second foldable fence part 93 is attached to an end portion of the first foldable fence part 92, and structured to swing outwardly of the first foldable fence part 92.

The second foldable fence part 93 includes: a frame 931 identical in specifications to the frame 911; a welded wire netting 932 identical in specifications to the welded wire netting 912; a frame support part 933 structured to support the frame 931 in a predetermined height position (identical in height to the frame 911) while being held upright by the support 90.

The frame support part 933 is structured to have the same specifications as the frame support portion 913, and connected to an end portion of the frame 921 of the first foldable fence part 92 via a hinge part 60, and structured to swing outwardly of the first foldable fence part 92.

Furthermore, the second foldable fence part 93 is provided with a handle 934 for carrying the safety fence 5, and a second angle adjustment plate 97b for defining a range of rotation of the second angled fence part 97.

As shown in FIG. 9 (b), the second angle adjustment plate 97b is formed with a slot 971b through which a rotation shaft of a second hand knob 98b is inserted for fixing the second angled fence part 97 to the second angle adjustment plate 97b. The slot 971b is arc-shaped and defines a range of rotation of the second angled fence part 97 from a position in parallel with the second foldable fence part 93 to a position at 270 degrees in the horizontal direction.

<Example of Third Foldable Fence Part 94> The third foldable fence part 94 is attached to a lower end portion of the fixed fence part 91, and structured to be arranged in parallel with the fixed fence part 91.

The third foldable fence part 94 includes: a substantially square frame 941 structured to be arranged between the frame 911 of the fixed fence part 91 and the frame support 913; and a welded wire netting 942 mounted to the frame 941.

The frame 941 is formed to be substantially identical in shape to the frame 911 of the fixed fence part 91, and is connected to the frame 911 of the fixed fence part 91 via a hinge part 60, and structured to swing outwardly of the fixed fence part 91.

<Example of Fourth Foldable Fence Part 95> The fourth foldable fence part 95 is attached to a lower end portion of the second foldable fence part 93, and structured to be arranged in parallel with the second foldable fence part 93.

The fourth foldable fence part 95 includes: a substantially square frame 951 structured to be arranged between the frame 931 of the second foldable fence part 93 and the frame support 933, and a welded wire netting 952 mounted to the frame 951.

The frame 951 is connected to the frame 931 via the hinge part 60, and structured to swing in the vertical direction, and be arranged in parallel with the frame 931 of the second foldable fence part 93.

<Example of First Angled Fence Part 96> The first angled fence part 96 is attached to an end portion of the fixed fence part 91, and structured to swing inwardly and outwardly of the fixed fence part 91.

The first angled fence part 96 includes: a rectangular frame 961 shorter and narrower than the frame 911 of the fixed fence part 91; a welded wire netting 962 having the same specifications as the fixed fence part 91; and a connecting member 963 extending along a long side of the frame 961.

The connecting member 963 is connected to an end portion of the frame 911 via a hinge part 60. Furthermore, the connecting member 963 includes an upper end portion structured such that a first hand knob 98a is screwed via a first angle adjustment plate 97a to the upper end portion.

<Example of Second Angled Fence Part 97> The second angled fence part 97 is attached to an end portion of the second foldable fence part 93, and structured to swing inwardly and outwardly of the second foldable fence part 93.

The second angled fence part 97 includes: a rectangular frame 971 shorter and narrower than the frame 931 of the second foldable fence part 93; a welded wire netting 972 having the same specifications as the fixed fence part 91; and a connecting member 973 extending along a long side of the frame 971.

The connecting member 973 is connected to an end portion of the frame 931 via a hinge part 60. Furthermore, the connecting member 973 includes an upper end portion structured such that a second hand knob 98b is screwed via a second angle adjustment plate 97b to the upper end portion.

As shown in FIG. 9 (*b*), the first angle adjustment plate 97a or the second angle adjustment plate 97b is provided with a connecting member 101 structured to connect the first angle adjustment plate 97a and the second angle adjustment plate 97b so as to place the second foldable fence part 93 and the fixed fence part 91 in parallel with each other.

<Example of First Support Member 98> At a side face of the support 90, the first support member 98 additionally supports the fixed fence part 91 on the support 90 substantially in parallel as described above.

As shown in FIG. 9 (*a*), the first support member 98 is made of a substantially L-shaped plate steel material (for example, stainless steel), and attached to side surfaces of the support 90 and the frame support portion 913 in the same plane.

<Example of Second Support Member 99> The second support member 99 is disposed at an upper face of the support 90, and structured to support the first foldable fence part 92, the second foldable fence part 93, and the fourth foldable fence part 95 in series with the fixed fence part 91.

As shown in FIG. 9 (*a*), the second support member 99 is made of steel (stainless steel) to have a rectangular plate shape, and is structured to move in the vertical direction on the side faces of the support 90 and the frame support part 933 in the same plane.

For example, when the first foldable fence part 92, the second foldable fence part 93, and the fourth foldable fence part 95 are arranged in series with the fixed fence part 91, the second support member 99 is fixed to the side surfaces of the frame 921 of the support 90 and the frame support part 933 by a fixing tool 991 such as a bolt.

On the other hand, when the first foldable fence part 92, the second foldable fence part 93, and the fourth foldable fence part 95 are folded outside the fixed fence part 91, the second support member 99 is fixed to the side face of the support 90 by the fixing tool 991 below the frame 921 and the frame support part 933.

<Example of Vehicle Restraining Device 10> As shown in FIG. 10, the vehicle restraining device 10 includes: a hub connecting part 11 attached to the wheel hub of the wheel 20 of the test vehicle 2; a wheel hub rod 12 connected rotatably to the hub connecting part 11; and a fixing rod 13 connected rotatably close to an end portion of the wheel hub rod 12 closer to the hub connecting part 11.

As shown in FIG. 10, the wheel hub rod 12 and the fixing rod 13 are held by a rod holder 14 that is mounted to an arbitrary position on a slide rail 42 of the vehicle testing device 1.

<Example of Use of Safety Fence 5> The following describes an example of use of the safety fence 5 according to the present embodiment with reference to FIGS. 8 and 10, in particular, an example of use of the safety fence 5 according to the second example shown in FIG. 9.

As shown in FIG. 8, the test vehicle 2 is placed on the pit 41. When the wheel 20 of the test vehicle 2 is placed on the roller 3, the safety fence 5 may be attached to or removed from the pit cover 4. When the safety fence 5 is attached, the support 90 of the safety fence 5 is fixed at a predetermined position on the pit cover 4 as shown in FIG. 9 (*a*), so that the safety fence 5 is arranged and fixed along a peripheral edge of the roller opening 40 of the pit cover 4 shown in FIGS. 8 and 10.

In particular, when the safety fence 5 is arranged substantially in parallel with the front wheel 20F of the test vehicle 2, the fixed fence part 91 is located at a position closer to the front end of the front wheel 20F of the test vehicle 2.

On the other hand, when the safety fence 5 is arranged substantially in parallel with the rear wheel 20R of the test vehicle 2, the fixed fence part 91 is located at a position closer to the rear end of the rear wheel 20R.

Next, with regard to the safety fence 5 for the rear wheel 20R, the third foldable fence part 94 is folded upward and arranged in parallel with the fixed fence part 91. Similarly, the fourth foldable fence part 95 is folded upward and arranged in parallel with the second foldable fence part 93.

When the first foldable fence part 92 and the second foldable fence part 93 are folded outside the fixed fence part 91, the second support member 99 shown in FIG. 9 (*a*) is fixed to the side face of the support 90 by the fixing tool 991 below the frame 921 and the frame support part 933. This allows the first foldable fence part 92 and the second foldable fence part 93 to be folded outside the fixed fence part 91.

Then, as shown in FIG. 9 (*d*), after the first foldable fence part 92 is rotated to the outside of the fixed fence part 91, the first angle adjustment plate 97a closer to the fixed fence part 91 and the second angle adjustment plate 97b closer to the second foldable fence part 93 are connected to each other by the connecting member 101. Under this condition, as shown in FIG. 9 (*d*), the fixed fence part 91 and the second foldable fence part 93 are arranged in parallel with each other via the first foldable fence part 92.

Also, with regard to the safety fence 5 for the front wheel 20F, by similar operation, under a condition that the first foldable fence part 92 and the second foldable fence part 93 are folded, the fixed fence part 91 and the second foldable fence part 93 are arranged in parallel with each other via the first foldable fence part 92.

The foregoing operation of the safety fence 5 allows the vehicle restraining device 10 to be connected to the wheel hub of the wheel 20 of the test vehicle 2. The following describes an example of connecting operation of the vehicle restraining device 10.

As shown in FIG. 9, the hub connecting part 11 of the vehicle restraining device 10 is attached to the wheel hub of the wheel 20 of the test vehicle 2, and the wheel hub rod 12 is connected to the hub connecting part 11. The fixing rod 13 is beforehand connected close to an end of the wheel hub rod 12. Then, the wheel hub rod 12 and the fixing rod 13 are held by the rod holder 14 placed at an arbitrary position on the slide rail 42 of the vehicle testing device 1.

Thereafter, when the connection between the first angle adjustment plate 97a and the second angle adjustment plate 97b by the connecting member 101 is released, the second foldable fence part 93 and the fourth foldable fence part 95 are arranged in series with the fixed fence part 91, as shown in FIG. 9 (a). Under this condition, the second support member 99 is fixed to the side faces of the support 90, the frame 921, and the frame support 933 by the fixing tool 991. This allows the first foldable fence part 92, the second foldable fence part 93, and the fourth foldable fence part 95 to be stably supported in series with the fixed fence part 91.

The safety fence 5 according to the first example is also attached to the pit cover 4 of the vehicle testing device 1 by the same process as the safety fence 5 according to the second example.

<Effects of Present Embodiment> With the safety fence 5 according to the first or second example, when the front door 21 or the rear door 22 of the test vehicle 2 is opened and closed, it is possible to prevent interference between the safety fence 5 and the front door 21 or rear door 22 by operation of the first foldable fence part 92, the second foldable fence part 93, the third foldable fence part 94, the fourth foldable fence part 95, the first angled fence part 96, and the second angled fence part 97. In particular, it is possible to move the center of the safety fence 5 from the wheel base of the test vehicle 2 to the outside of the test vehicle 2, and thereby expand the range of opening and closing of the front door 21 or rear door 22 of the test vehicle 2 prepared for the vehicle testing device 1.

Furthermore, with regard to the safety fence 5 for the front wheel 20F, the fixed fence part 91 is arranged at a position closer to the front end of the front wheel 20F of the test vehicle 2, substantially in parallel with the front wheel 20F. With regard to the safety fence 5 for the rear wheel 20R, the fixed fence part 91 is arranged at a position closer to the rear of the rear wheel 20R of the test vehicle 2, substantially in parallel with the rear wheel 20R. In addition, the first foldable fence part 92, the second foldable fence part 93, the third foldable fence 94, and the fourth foldable fence part 95 can be rotated and folded to the outside of the fixed fence part 91. This serves to flexibly adapt to test vehicles 2 various in size, and further enhance the flexibility described above.

Furthermore, if the safety fence 5 is composed of steel materials such as aluminum frames, the safety fence 5 can be made relatively light and compact. This serves to allow the safety fence 5 to be more easily detached for maintenance than conventional safety fences, and further easily carried by the handles 914, 934.

Furthermore, the feature of the safety fence 5 that the first foldable fence part 92, the second foldable fence part 93, the third foldable fence 94, and the fourth foldable fence part 95 are structured to be folded and arranged in parallel with the fixed fence part 91, serves to ensure an empty space at the lower side of the safety fence 5, particularly, below the fixed fence part 91.

Therefore, even when a vehicle restraining device of a wheel hub connection type like the vehicle restraining device 10 shown in FIG. 10 is employed by the vehicle testing device 1, it is possible to prevent physical interference between the safety fence 5 and the wheel hub rod 12 and the fixing rod 13 of the vehicle restraining device 10. Furthermore, it enhances the efficiency of workability when the wheel hub rods 12 of the vehicle restraining device 10 are attached to the wheel hubs of the front wheel 20F and the rear wheel 20R of the test vehicle 2.

The safety fence 5 may not be necessarily attached to the pit cover 4 but may be attached to the roller cover of the roller 3. This also serves to produce the effects described above, and prevent entry of a person into a space between the test vehicle 2 and the safety fence 5.

Furthermore, the feature that the frame support portion 913 can be attached to the pit cover 4 or the roller cover, serves to allow the safety fence 5 to be applied to an existing vehicle testing device. In particular, the safety fence 5 can be quickly and firmly attached to the pit cover 4 or the roller cover by the fixing tool 6.

The present invention is not limited to the fourth embodiment, but may be implemented in various forms within the scope of the claims of the present invention. Specifically, the safety fence according to the present invention is not limited to the first and second examples, but may be formed appropriately in accordance with various vehicle testing devices, vehicle restraining devices, and vehicle test systems. For example, with regard to the configuration of FIG. 9, the safety fence 5 may be composed of the fixed fence part 91, the first foldable fence part 92, the second foldable fence part 93, and the fourth foldable fence part 95, or may be composed of the fixed fence part 91, the first foldable fence part 92, the second foldable fence part 93, the third foldable fence part 94. These embodiments also belong to the technical scope of the present invention.

The invention claimed is:

1. A vehicle testing device comprising a safety fence for a front wheel of a test vehicle, wherein the safety fence includes:
   a front-wheel-side fixed fence part structured to be disposed at a front side of the front wheel, and arranged substantially in parallel with the front wheel;
   a first front-wheel-side slide fence part arranged in parallel with the front-wheel-side fixed fence part, and structured to move toward a central part of the test vehicle; and
   a second front-wheel-side slide fence part arranged in parallel with the front-wheel-side fixed fence part, and structured to move in a vertical direction of the test vehicle.

2. The vehicle testing device as claimed in claim 1, comprising a third front-wheel-side slide fence part arranged in parallel with the first front-wheel-side slide fence part, and structured to move in the vertical direction of the test vehicle.

3. A vehicle testing device comprising a safety fence for a rear wheel of a test vehicle, wherein the safety fence includes:
   a rear-wheel-side fixed fence part structured to be disposed at a rear side of the rear wheel, and arranged substantially in parallel with the rear wheel;

a first rear-wheel-side slide fence part arranged in parallel with the rear-wheel-side fixed fence part, and structured to move toward a central part of the test vehicle; and a second rear-wheel-side slide fence part arranged in parallel with the rear-wheel-side fixed fence part, and structured to move in a vertical direction of the test vehicle.

4. The vehicle testing device as claimed in claim 3, comprising a third rear-wheel-side slide fence part arranged in parallel with the first rear-wheel-side slide fence part, and structured to move in the vertical direction of the test vehicle.

5. A vehicle testing device comprising:
a front-wheel-side safety fence for a front wheel of a test vehicle; and
a rear-wheel-side safety fence for a rear wheel of the test vehicle;
wherein the front-wheel-side safety fence includes:
a front-wheel-side fixed fence part structured to be disposed at a front side of the front wheel, and arranged substantially in parallel with the front wheel;
a first front-wheel-side slide fence part arranged in parallel with the front-wheel-side fixed fence part, and structured to move toward a central part of the test vehicle; and
a second front-wheel-side slide fence part arranged in parallel with the front-wheel-side fixed fence part, and structured to move in a vertical direction of the test vehicle; and
wherein the rear-wheel-side safety fence includes:
a rear-wheel-side fixed fence part structured to be disposed at a rear side of the rear wheel, and arranged substantially in parallel with the rear wheel;
a first rear-wheel-side slide fence part arranged in parallel with the rear-wheel-side fixed fence part, and structured to move toward the central part of the test vehicle; and
a second rear-wheel-side slide fence part arranged in parallel with the rear-wheel-side fixed fence part, and structured to move in the vertical direction of the test vehicle.

6. The vehicle testing device as claimed in claim 5, comprising a third front-wheel-side slide fence part arranged in parallel with the first front-wheel-side slide fence part, and structured to move in the vertical direction of the test vehicle.

7. The vehicle testing device as claimed in claim 5, comprising a third rear-wheel-side slide fence part arranged in parallel with the first rear-wheel-side slide fence part, and structured to move in the vertical direction of the test vehicle.

8. A vehicle testing device comprising a safety fence for a front wheel of a test vehicle, wherein the safety fence includes:
a front-wheel-side fixed fence part structured to be disposed at a front side of the front wheel, and arranged substantially in parallel with the front wheel;
a first front-wheel-side foldable fence part attached to an end portion of the front-wheel-side fixed fence part, and structured to swing outwardly of the front-wheel-side fixed fence part; and
a second front-wheel-side foldable fence part attached to an end portion of the first front-wheel-side foldable fence part, and structured to swing outwardly of the first front-wheel-side foldable fence part.

9. The vehicle testing device as claimed in claim 8, comprising a third front-wheel-side foldable fence part attached to a lower end portion of the front-wheel-side fixed fence part, and structured to be arranged in parallel with the front-wheel-side fixed fence part.

10. The vehicle testing device as claimed in claim 8, comprising a fourth front-wheel-side foldable fence part attached to a lower end portion of the second front-wheel-side foldable fence part, and structured to be arranged in parallel with the second front-wheel-side foldable fence part.

11. A vehicle testing device comprising a safety fence for a rear wheel of a test vehicle, wherein the safety fence includes:
a rear-wheel-side fixed fence part structured to be disposed at a rear side of the rear wheel, and arranged substantially in parallel with the rear wheel;
a first rear-wheel-side foldable fence part attached to an end portion of the rear-wheel-side fixed fence part, and structured to swing outwardly of the rear-wheel-side fixed fence part; and
a second rear-wheel-side foldable fence part attached to an end portion of the first rear-wheel-side foldable fence part, and structured to swing outwardly of the first rear-wheel-side foldable fence part.

12. The vehicle testing device as claimed in claim 11, comprising a third rear-wheel-side foldable fence part attached to a lower end portion of the rear-wheel-side fixed fence part, and structured to be arranged in parallel with the rear-wheel-side fixed fence part.

13. The vehicle testing device as claimed in claim 11, comprising a fourth rear-wheel-side foldable fence part attached to a lower end portion of the second rear-wheel-side foldable fence part, and structured to be arranged in parallel with the second rear-wheel-side foldable fence part.

14. A vehicle testing device comprising:
a front-wheel-side safety fence for a front wheel of a test vehicle; and
a rear-wheel-side safety fence for a rear wheel of the test vehicle;
wherein the front-wheel-side safety fence includes:
a front-wheel-side fixed fence part structured to be disposed at a front side of the front wheel, and arranged substantially in parallel with the front wheel;
a first front-wheel-side foldable fence part attached to an end portion of the front-wheel-side fixed fence part, and structured to swing outwardly of the front-wheel-side fixed fence part; and
a second front-wheel-side foldable fence part attached to an end portion of the first front-wheel-side foldable fence part, and structured to swing outwardly of the first front-wheel-side foldable fence part; and
wherein the rear-wheel-side safety fence includes:
a rear-wheel-side fixed fence part structured to be disposed at a rear side of the rear wheel, and arranged substantially in parallel with the rear wheel;
a first rear-wheel-side foldable fence part attached to an end portion of the rear-wheel-side fixed fence part, and structured to swing outwardly of the rear-wheel-side fixed fence part; and
a second rear-wheel-side foldable fence part attached to an end portion of the first rear-wheel-side foldable fence part, and structured to swing outwardly of the first rear-wheel-side foldable fence part.

15. The vehicle testing device as claimed in claim 14, comprising a third front-wheel-side foldable fence part attached to a lower end portion of the front-wheel-side fixed fence part, and structured to be arranged in parallel with the front-wheel-side fixed fence part.

16. The vehicle testing device as claimed in claim 14, comprising a third rear-wheel-side foldable fence part attached to a lower end portion of the rear-wheel-side fixed fence part, and structured to be arranged in parallel with the rear-wheel-side fixed fence part.

17. The vehicle testing device as claimed in claim 14, comprising a fourth front-wheel-side foldable fence part attached to a lower end portion of the second front-wheel-side foldable fence part, and structured to be arranged in parallel with the second front-wheel-side foldable fence part.

18. The vehicle testing device as claimed in claim 14, comprising a fourth rear-wheel-side foldable fence part attached to a lower end portion of the second rear-wheel-side foldable fence part, and structured to be arranged in parallel with the second rear-wheel-side foldable fence part.

\* \* \* \* \*